(12) United States Patent
Rupp et al.

(10) Patent No.: US 6,278,209 B1
(45) Date of Patent: Aug. 21, 2001

(54) DECOUPLING DEVICE FOR AN ELECTRIC MOTOR

(75) Inventors: Bernhard Rupp, Sulzfeld; Gerd Knoepfel, Buehl; Otto Brass, Buehl; Gerhard Zink, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,645
(22) PCT Filed: Jan. 14, 1999
(86) PCT No.: PCT/DE99/00067
  § 371 Date: Nov. 26, 1999
  § 102(e) Date: Nov. 26, 1999
(87) PCT Pub. No.: WO99/50082
  PCT Pub. Date: Oct. 7, 1999

(30) Foreign Application Priority Data

Mar. 28, 1998 (DE) ............................................. 198 13 984

(51) Int. Cl.[7] ............................................. H02K 5/24
(52) U.S. Cl. ............................. 310/91; 310/51; 248/608; 417/424.2
(58) Field of Search ................... 310/51, 91, 89; 417/424.1, 423.14, 424.2; 248/605, 608

(56) References Cited

U.S. PATENT DOCUMENTS

| 1,574,985 | 3/1926 | McWain | 310/51 |
| 2,368,727 | 2/1945 | Robinson | 310/51 |
| 4,602,176 | 7/1986 | Baker | 310/51 |
| 4,946,351 | 8/1990 | Richardson | 417/363 |

FOREIGN PATENT DOCUMENTS

| 36 38 393 C2 | 12/1988 | (DE) | H02K/5/24 |
| 88 11 934 | 12/1988 | (DE) | H02K/5/24 |
| 42 40 776 C1 | 3/1994 | (DE) | H02K/5/26 |
| 0 453 616 A! | 4/1990 | (EP) | H02K/5/24 |
| 596837 | * 10/1993 | (EP) | F04D/29/66 |
| 2 049 307 | 3/1971 | (FR) | H02K/5/00 |

* cited by examiner

Primary Examiner—Burton S. Mullins
(74) Attorney, Agent, or Firm—Ronald E. Greigg; Edwin E. Greigg

(57) ABSTRACT

Decoupling devices for an electric motor in relation to a housing usually have decoupling bushes made of elastic material, which are disposed between a motor mount and the housing and extend along a bush longitudinal axis. The decoupling device includes a first contact point at which the decoupling device rests against the motor mount, and a second contact point at which the decoupling device rests at least indirectly against the housing, each decoupling bush is secured so that the decoupling bush can be radially deflected in relation to the bush longitudinal axis, by means of which the forces are in fact transmitted, but vibrations are damped or insulated.

12 Claims, 2 Drawing Sheets

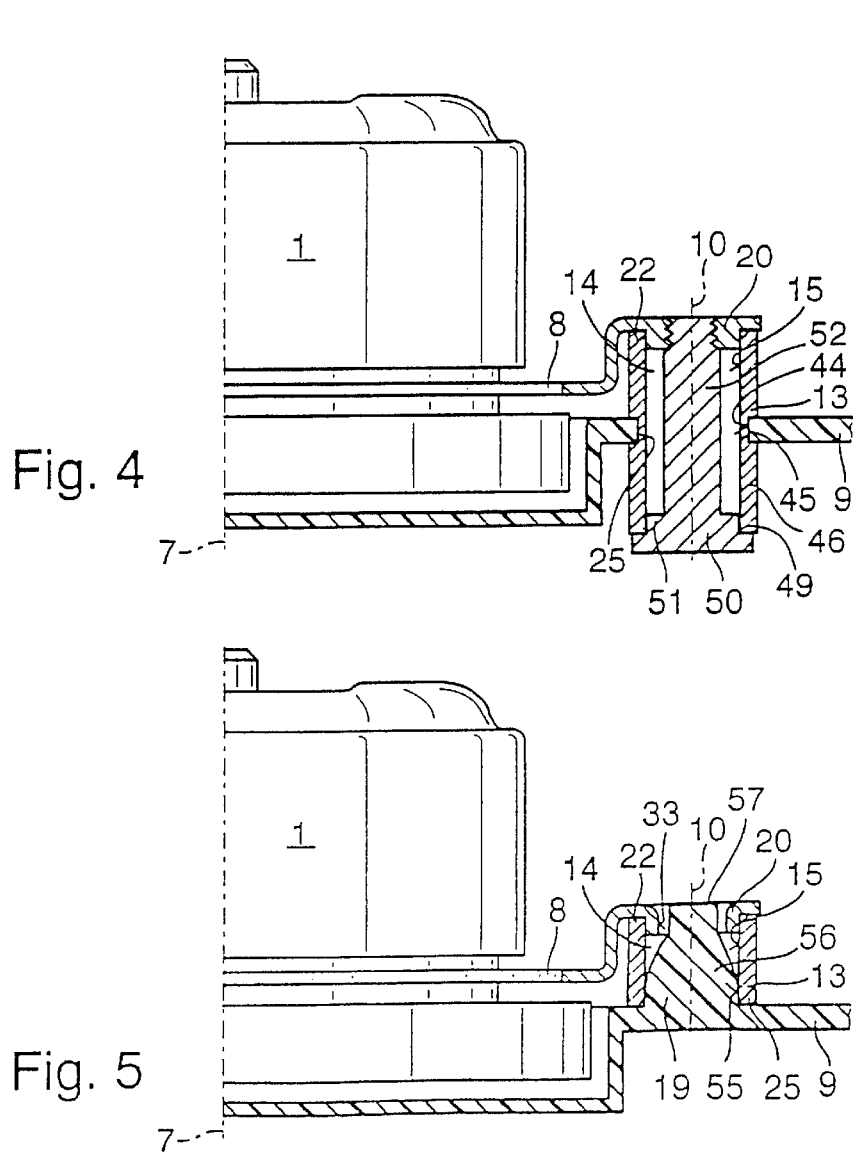

DECOUPLING DEVICE FOR AN ELECTRIC MOTOR

PRIOR ART

The invention is based on a decoupling device for an electric motor. A decoupling device has already been disclosed (DE 42 40 776 C1) in which the decoupling between the electric motor and fan housing does in fact take place by way of elastic decoupling elements, but this decoupling is still relatively rigid so that the operating noise of the electric motor and operation-induced vibrations of the fan, e.g. due to imbalance of the fan wheel, are still transmitted to the fan housing to a high degree and lead to an undesirable noise generation.

ADVANTAGES OF THE INVENTION

The decoupling device according to the intention, has the advantage over the prior art that it improves the noise decoupling of the electric motor in relation to the housing in a simple manner.

Advantageous improvements and updates of the decoupling device disclosed herein are possible by means of the measures taken hereinafter.

The embodiment of the decoupling elements as decoupling bushes permits a particularly effective vibration decoupling.

It is particularly advantageous, at a first decoupling point, to embody a circumferential retaining collar on the motor mount, which retaining collar, at the first contact point, protrudes into the through opening of the decoupling bush and rests against its interior wall. To embody a circumferential housing collar on the housing, which housing collar, at the second contact point, protrudes into the through opening of the decoupling bush and rests against its interior wall. It is also particularly advantageous, at a second decoupling point, to embody a circumferential retaining collar on the motor mount which retaining collar, at the first contact point, protrudes into the through opening of the decoupling bush and rests against its interior wall and to provide a securing element in which a distance sleeve and a circumferential element collar are embodied. The element collar, at the second contact point, protrudes into the through opening of the decoupling bush and rests against its interior wall, wherein the distance sleeve penetrates the through opening and the retaining collar with radial clearance and is secured resting against the housing by means of a screw connection.

If at least two pairs of decoupling points are provided, which are spaced equidistantly apart from one another in the circumference direction of the motor mount so that the first and second decoupling points alternate, this produces the particular advantage that the decoupling bushes are acted on exclusively by pressure and thrust, and therefore an axial fastening for example by means of gluing or vulcanization of the decoupling bushes can be eliminated, which improves long-term vibration resistance.

It is also advantageous to embody a circumferential retaining collar on the motor mount which, at the first contact point, protrudes into the through opening of the decoupling bush and rests against its interior wall and to embody a circumferential housing collar on the housing. The housing collar, at the second contact point, protrudes into the through opening of the decoupling bush and, starting from the motor mount, to provide a first collar section which rests against the interior wall of the through opening. A second tapering collar section, and a third cylindrical collar section, protrudes with radial clearance into a collar opening of the retaining collar. The radial mobility of the decoupling bushes can thereby be limited by means of stops and the radial rigidity of the decoupling bushes can be influenced as a function of the radial deflection.

It is likewise advantageous to embody a circumferential retaining collar on the motor mount which, at the first contact point, protrudes into the through opening of the decoupling bush and rests against its interior wall, and to provide the housing with a housing opening in which the decoupling bush engages with a bush groove at the second contact point. It is also advantageous to embody a balancing section that adjoins the decoupling bush at the second contact point and whose end supports a covering body, which has a cover collar that protrudes into the through opening of the decoupling bush and has a cover shaft, wherein the cover collar rests against the interior wall of the through opening and the cover shaft penetrates the through opening with radial clearance and is fastened to the motor mount. In this manner, the damping property of the decoupling bush can also be influenced and the radial deflection can be limited.

A secure retention of the decoupling bush can be advantageously achieved by virtue of the fact that a circumferential retaining collar is embodied on the motor mount. The collar is U-shaped at the first contact point and, forming a retaining groove, protrudes into the through opening of the decoupling bush, and the decoupling bush engages with a collar in the retaining groove and engages with a bush groove at the second contact point in a housing opening of the housing.

BRIEF DESCRIPTION OF THE DRAWING

Exemplary embodiments of the invention are shown in a simplified fashion in the drawings and will be explained in detail in the subsequent description. FIGS. 3 to 5 respectively show partial depictions of a second to fourth exemplary embodiment of a decoupling device according to the invention for an electric motor in relation to a housing.

DESCRIPTION OF THE EXEMPLARY EMBODIMENTS

Figure 1:
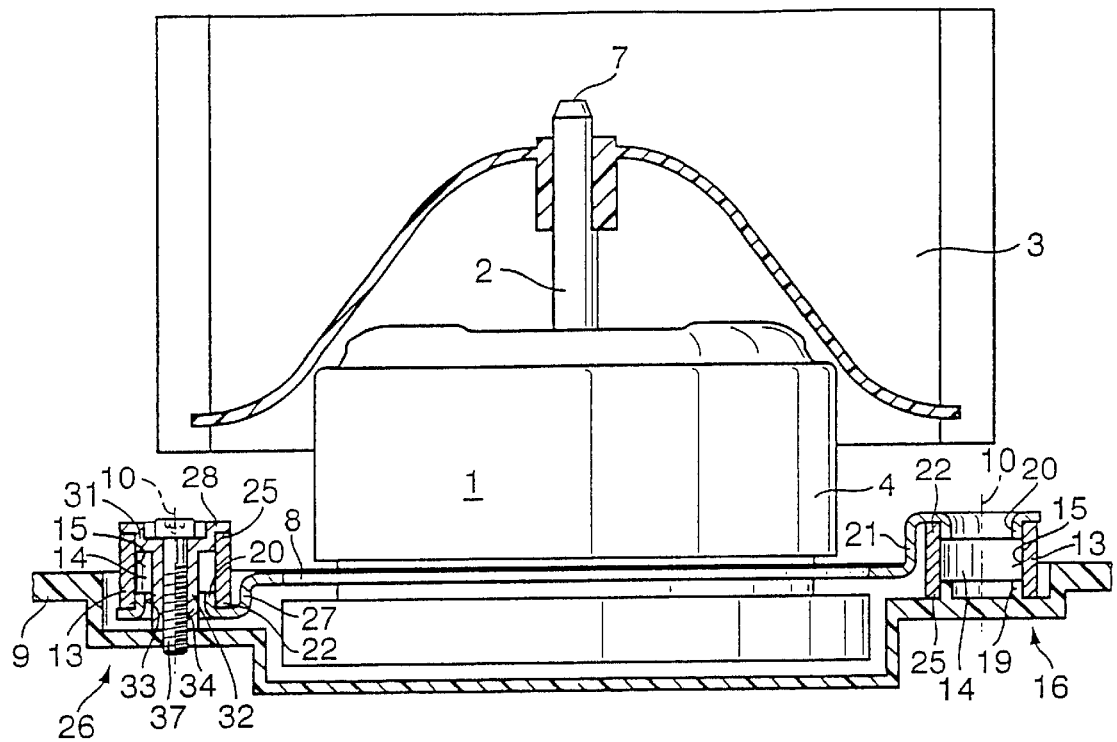
FIG. 1 shows a first exemplary embodiment according to the invention of a decoupling device for an electric motor in relation to a housing in accordance with a section along the line I—I in FIG. 2, shows a schematic representation of a motor mount with decoupling bushes according to the invention disposed in accordance with FIG. 1.

In FIG. 1, the numeral 1 is used to indicate an electric motor, for example an electronically commutated electric motor of the external rotor motor type, which is used for example to drive an air conditioning fan. The electric motor 1, which in this instance is a so-called fan motor, has a motor shaft 2 which supports a fan wheel 3. The electric motor 1 has a motor housing 4 that is connected to a disc-shaped motor mount 8, which is disposed lateral to a motor longitudinal axis 7 and is connected to the motor housing 4. The motor mount 8 is formed, for example, out of sheet metal.

The electric motor 1 is a component, for example, of an air conditioning system in a motor vehicle, of which only a housing 9 is schematically represented, which is made of plastic, for example. In order to secure the electric motor 1 and to damp and insulate vibrations of the electric motor 1 in relation to the housing 9, decoupling devices are provided each of which has a decoupling bush 13, which constitutes a decoupling element, extends along a longitudinal axis 10, and is made of an elastic material such as rubber or plastic. Each decoupling bush 13 has a through opening 14 with an interior wall 15. A first decoupling point 16 is depicted on the right in FIG. 1. At the first decoupling point 16, the housing 9 has a circular, circumferential housing collar 19 and the motor mount 8 has an annular, circumferential retaining collar 20. The housing collar 19 and retaining collar 20 are oriented toward' one another. The retaining collar 20 is embodied on a first offset part 21 of the motor mount 8, which is bent away from the housing 9. Each decoupling bush 13 has a first contact point 22 at which it rests against the motor mount 8, wherein the retaining collar 20 protrudes into the through opening 14 and rests against its interior wall 15. The decoupling bush 13 also has a second contact point 25 at which the bush rests at least indirectly against the housing 9. At the first decoupling point 16, the second contact point of the decoupling bush 13 rests directly against the housing 9 in such a way that the housing collar 19 protrudes into the through opening 14 and rests against its interior wall 15. The motor mount 8 is consequently supported on the housing 9 by way of the decoupling bush 13. Between the first contact point 22 and the second contact point 25 of the decoupling bush 13, the elastic decoupling bush 13 can move freely in the radial direction since no means are provided for limiting movement in the radial direction either inside the through opening 14 or outside it. Vibrations of the electric motor 1 can consequently be absorbed and damped through radial expansion of the decoupling bush 13 so that almost no transmission of body noise to the housing 9 takes place. The damping properties of the decoupling bush are influenced by means of the material selection, the length, the diameter, and the wall thickness of the decoupling bush 13.

At the second decoupling point 26 shown on the left in FIG. 1, the retaining collar 20 is embodied on a second offset part 27 of the motor mount 8, which extends toward the housing 9, and at the first contact point 22, this retaining collar 20 extends away from the housing 9 into the through opening 14 and rests against its interior wall 15. A housing collar is not provided at the second decoupling point 26, but rather the decoupling bush 13 rests with its second contact point 25 indirectly against the housing 9 by virtue of the fact that the decoupling bush 13 extends away from the housing 9 to a securing element 28. The securing element 28 is embodied with a circumferential element collar 31 and a distance sleeve 32. The element collar 31 protrudes into the through opening 14 of the decoupling bush 13 and rests against its interior wall 15. The distance sleeve 32 respectively penetrates the through opening 14 of the decoupling bush 13 as well as a collar opening 33 of the retaining collar 20 with radial clearance and rests against the housing 9. An element opening 34 extends through the distance sleeve 32 along the bush longitudinal axis 10 and a screw 37 is slid through this element opening 34 and screwed to the housing 9. Since between the first contact point 22 and the second contact point 25, the decoupling bush 13 has a radial clearance in relation to the distance sleeve 32 and likewise, a radial clearance is provided between the distance sleeve 32 and the collar opening 33, vibrations of the electric motor 1 in the radial direction are absorbed and damped by means of the radial expansion of the decoupling bush 13. If the amplitude of the radial vibrations of the motor mount 8 is so great that the retaining collar 20 comes to rest against the distance sleeve 32, then the distance sleeve 32 functions as a stop and limits the vibration amplitude in order to prevent an overload of the decoupling bush 13.

Figure 2:
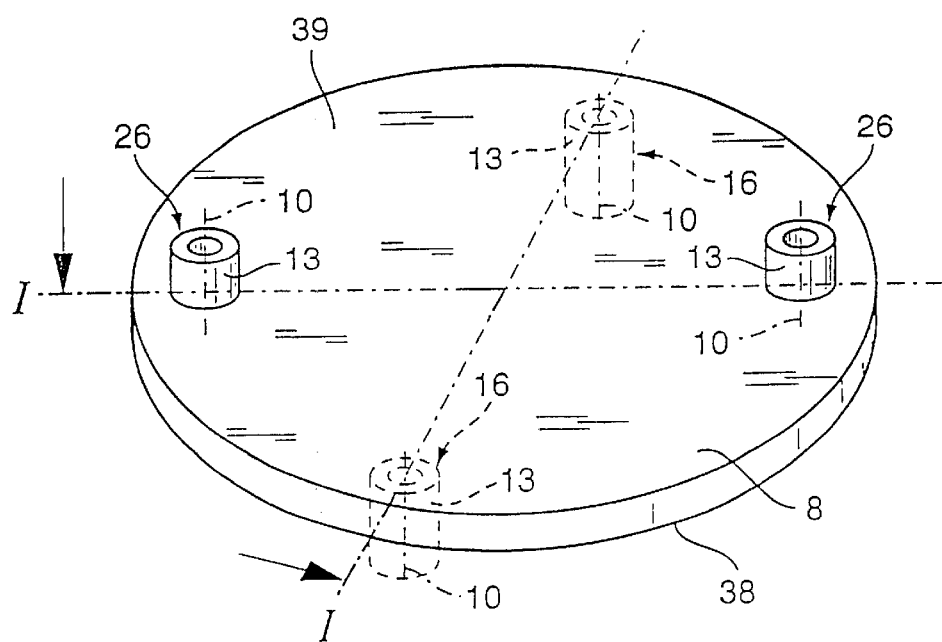

An advantageous disposition of the first decoupling point 16 and the second decoupling point 26 shown in FIG. 1 is depicted in FIG. 2, wherein FIG. 1 shows a section along the line I—I in FIG. 2. The first decoupling point 16 shown in FIG. 1, therefore, is actually pivoted by 90°. In the advantageous disposition depicted in FIG. 2, a pair of first decoupling points 16 and a pair of second decoupling points 26 are shown on the schematically represented motor mount 8, wherein viewed in terms of the circumference direction of the motor mount 8, the first decoupling points 16 extend from a bottom surface 38 of the motor mount 8 in the direction of a housing 9 and are offset from each other by 180°, while the second decoupling points 26 are offset from the first decoupling points 16 by 90°, are offset from each other by 180°, and are disposed on a top surface 39 of the motor mount 8. Consequently, at least one pair of first coupling points 16 and at least one pair of second coupling points 26 are always provided on the motor mount 8, wherein the first coupling points 16 and second coupling points 26 are spaced equidistantly from one another in the circumference direction of the motor mount 8 and are alternatingly disposed on opposite sides. A disposition of this kind is therefore advantageous because with the occurrence of a tensile stress, for example on the second decoupling point 26 shown on the left in FIG. 2, this tensile stress via the motor mount 8 is converted into a moment which directs compressive forces to the first decoupling points 16 and to the second decoupling point 26 on the right. Consequently, the decoupling bushes 13 are acted on exclusively by pressure and thrust so that a direct axial fastening of the decoupling bushes 13 to the motor mount 8 and the housing 9 or to the securing element 28 by means of gluing or positive engagement is not necessary, which improves vibration resistance. The vibration decoupling described above does not require the use of decoupling bushes. On the contrary, decoupling elements that are embodied as solid bodies can also be used, which are comprised of elastic material and are secured to the motor mount 8 and the housing 9, for example in a positively engaged manner.

In the subsequent FIGS. 3 to 5, parts that are the same or function in the same manner are labeled with the same reference numerals as in FIGS. 1 and 2, wherein only one decoupling point is shown of the at least three decoupling points that are provided spaced equidistantly from one another in the circumference direction of the motor mount 8. FIG. 3 shows the motor mount 8 with a circumferential retaining collar 20, which is U-shaped at the first contact point 22 and, forming a retaining groove 40, protrudes into the through opening 14 of the decoupling bush 13. At the first contact point 22, the decoupling bush 13 has a collar 43 that is directed radially inward, engages in the retaining groove 40, and fixes the decoupling bush 13 in it. The bush at the second contact point 25, the decoupling bush 13 has a bush groove 44, which engages in detent fashion in a housing opening 45 of the housing 9 so that the decoupling bush 13 is fixed in the housing opening 45. Consequently, the decoupling bush 13 can be radially deflected between the first contact point 22 and the second contact point 25, and as a result, can damp or insulate motor vibrations.

In the exemplary embodiment according to FIG. 4, starting from the second contact point 25, the decoupling bush 13 has a balancing section 46, which protrudes beyond the housing 9 and whose end 49 supports a covering body 50. The covering body 50 protrudes into the through opening 14 with a cover collar 51 that rests against the interior wall 15 of the end 49 and with a cover shaft 52 adjoining this cover collar 51, wherein there is a radial clearance between the cover shaft 52 and the interior wall 15, and the cover shaft 52 is fastened in the retaining collar 20, for example is screw connected. When there is a vibrating motion of the electric motor 1, the decoupling bush 13 can expand radially in order to damp the vibration, wherein with a maximal permissible vibrating motion, the cover shaft 52 serves as a stop and comes into contact with the interior wall 15 and thus indirectly with the housing opening 45 and therefore prevents a damage to the decoupling bush 13. The damping properties of the decoupling bush 13 thereby can be influenced not only by means of the axial length between the first contact point 22 and the second contact point 25, but also by means of the axial length of the balancing section 46 along the bush longitudinal axis 10. At the first contact point 22, the decoupling bush 13 can be glued to the retaining collar 20 and at the and 49, it can be glued to the cover collar 51.

In the exemplary embodiment according to FIG. 5, the first contact point 22 of the decoupling bush 13 rests against the retaining collar 20 and the second contact point 25 rests against the housing collar 19 which, with a first collar section 55, rests against the interior wall 15 of the through opening 14 and has a tapering second collar section 56 adjoining this, which extends, for example, convexly with radial clearance from the interior wall 15. The second collar section 56 is joined by a third cylindrical collar section 57 of the housing collar 19, which protrudes with radial clearance into the collar opening 33 of the retaining collar 20. At its first contact point 22 and its second contact point 25, the decoupling bush 13 is glued, for example, to the housing collar 19 and the retaining collar 20 respectively. When the decoupling bush 13 is radially deflected in order to damp the vibration of the electric motor 1, first, the interior wall 15 of the decoupling bush 13 is supported more or less against the tapering second collar section 56 of the housing collar 19, which causes the spring properties of the decoupling bush 13 to become more rigid until the third collar section 57 rests against the wall of the collar opening 33 in order to limit the maximal permissible vibrating motion.

In the exemplary embodiments According to FIGS. 3 to 5, at least two of the respective decoupling points shown can be provided between the motor mount 8 and the housing 9, but decoupling points that alternate in pairs in accordance with the exemplary embodiment according to FIGS. 1 and 2 can also be used.

The foregoing relates to a preferred exemplary embodiments of the invention, it being understood that other variants and embodiments thereof are possible within-the spirit and scope of the invention, the latter being defined by the appended claims.

What is claimed is:

1. A decoupling device for an electric motor in relation to a housing, comprising a motor mount that is connected to a motor housing of the electric motor and at least two decoupling elements made of elastic material, which extend along a longitudinal axis and coaxially to the axis and each of the at least two decoupling elements have a through opening with an interior wall, wherein each decoupling element (13) at least indirectly rests with a first contact point (22) against the motor mount (8) and rests with a second contact point (25) at least indirectly against the housing (9), the decoupling element is embodied as a decoupling bush (13) and, between the first contact point (22) and the second contact point (25), each decoupling bush (13) is secured so that the decoupling bush can be radially deflected in relation to the longitudinal axis (10), and at a first decoupling point (16) a circumferential retaining collar (20) is embodied on the motor mount (8) and at the first contact point (22) said retaining collar (20) protrudes into the through opening (14) of the decoupling bush (13) and rests against an interior wall (15), and a circumferential housing collar (19) is embodied on the housing (9), and at the second contact point (25), said housing collar (19) protrudes into the through opening (14) of the decoupling bush (13) and rests against the interior wall (15).

2. The decoupling device according to claim 1, in which at least two pairs of decoupling points (16, 26) are provided which are spaced equidistantly from one another in the circumferential direction of the motor mount (8) so that the first decoupling point (16) and second decoupling points (26) alternate.

3. A decoupling device for an electric motor in relation to a housing, comprising a motor mount that is connected to a motor housing of the electric motor and at least two decoupling elements made of elastic material, which extend along a longitudinal axis and coaxially to the axis and decoupling each of the at least two elements have a through opening with an interior wall, wherein each decoupling element (13) at least indirectly rests with a first contact point (22) against the motor mount (8) and rests with a second contact point (25) at least indirectly against the housing (9), the decoupling element is embodied as a decoupling bush (13) and, between the first contact point (22) and the second contact point (25), each decoupling bush (13) is secured so that the decoupling bush can be radially deflected in relation to the longitudinal axis (10), and at a second decoupling point (26) a circumferential retaining collar (20) is embodied on the motor mount (8) and at the first contact point (22) said retaining collar (20) protrudes into the through opening (14) of the decoupling bush (13) and rests against an interior wall (15), and a securing element (28) is provided in which a distance sleeve (32) and a circumferential element collar (31) are embodied, and at the second contact point (25) said element collar (31) protrudes into the through opening (14) of the decoupling bush (13) and rests against the interior wall (15) and the distance sleeve (32) penetrates the through opening (14) and the retaining collar (20) with radial clearance and is secured resting against the housing (9) by means of a screw connection (37).

4. The decoupling device according to claim 3, in which at least two pairs of decoupling points (16, 26) are provided which are spaced equidistantly from one another in the circumference direction of the motor mount (8) so that the first decoupling point (16) and second decoupling points (26) alternate.

5. A decoupling device for an electric motor in relation to a housing, comprising a motor mount that is connected to a motor housing of the electric motor and at least two decoupling elements made of elastic material, said at least two decoupling elements have a first contact point at which said at least two decoupling elements rest at least indirectly against the motor mount, and a second contact point at which said at least two decoupling elements rest at least indirectly against the housing, at a first decoupling point (16), one of the at least two decoupling elements (13) is disposed between a bottom surface (38) of the motor mount (8) and the housing (9) and at a second decoupling point (26) the other of the at least two decoupling elements (13) is disposed between a top surface (39) of the motor mount (8) and the housing (9), wherein at least two pairs of first and second decoupling points (16, 26) are provided which are spaced equidistantly from one another in the circumference direction of the motor mount (8) so that the first decoupling points (16) and the second decoupling points (26) alternate.

6. The decoupling device according to claim 5, in which at least one decoupling element is embodied as a decoupling bush (13) with a through opening (14) and an interior wall

(15) and, between the first contact point (22) and the second contact point (25), each decoupling bush (13) is secured so that the decoupling bush can be radially deflected in relation to a bush longitudinal axis (10).

7. The decoupling device according to claim 6, in which at the first decoupling point (16) a circumferential retaining collar (20) is embodied on the motor mount (8) and at the first contact point (22) this retaining collar (20) protrudes into the through bore (14) of the decoupling bush (13) and rests against an interior wall (15), and a circumferential housing collar (19) is embodied on the housing (9), and at the second contact point (25) said housing collar (19) protrudes into the through opening (14) of the decoupling bush (13) and rests against the interior wall (15).

8. The decoupling device according to claim 6, in which at the second decoupling point (26) a circumferential retaining collar (20) is embodied on the motor mount (8) and at the first contact point (22) said retaining collar (20) protrudes into the through opening (14) of the decoupling bush (13) and rests against the interior wall (15), and a retaining element (28) is provided in which a distance sleeve (32) and a circumferential element collar (31) are embodied, and at the second contact point (25) said element collar (31) protrudes into the through opening (14) of the decoupling bush (13) and rests against the interior wall (15), and the distance sleeve (32) penetrates the through opening (14) and the retaining collar (20) with radial clearance and is secured resting against the housing (9) by means of a screw connection (37).

9. A decoupling device for an electric motor in relation to a housing, comprising a motor mount that is connected to a motor housing of the electric motor and at least two decoupling elements made of elastic material, which extend along a longitudinal axis and coaxially to the axis and each of the at least two decoupling elements have a through opening with an interior wall, wherein each decoupling element (13) at least indirectly rests with a first contact point (22) against the motor mount (8) and rests with a second contact point (25) at least indirectly against the housing (9), the decoupling element is embodied as a decoupling bush (13) and, between the first contact point (22) and the second contact point (25), each decoupling bush (13) is secured so that the decoupling bush can be radially deflected in relation to the longitudinal axis (10), and a circumferential retaining collar (20) is embodied on the motor mount (8) and at the first contact point (22), said retaining collar (20) protrudes into the through opening (14) of the decoupling bush (13) and rests against its interior wall (15), and a circumferential housing collar (19) is embodied on the housing (9), and at the second contact point (25) said housing collar (19) protrudes into the through opening (14) of the decoupling bush (13) and, starting from the motor mount (8) has a fist collar section (55) resting against the interior wall (15) of the through opening (14), a second tapering collar section (56), and a third cylindrical collar section (57) which protrudes with radial clearance into a collar opening (33) of the retaining collar (20).

10. A decoupling device for an electric motor in relation to a housing, comprising a motor mount that is connected to a motor housing of the electric motor and at least two decoupling elements made of elastic material, which extend along a longitudinal axis and coaxially to the axis and each of the at least two decoupling element have a through opening with an interior wall, wherein each decoupling element (13) at least indirectly rests with a first contact point (22) against the motor mount (8) and rests with a second contact point (25) at least indirectly against the housing (9), the decoupling element is embodied as a decoupling bush (13) and, between the first contact point (22) and the second contact point (25), each decoupling bush (13) is secured so that the decoupling bush can be radially deflected in relation to the longitudinal axis (10), and a circumferential retaining collar (20) is embodied on the motor mount (8) and at the first contact point (22), said retaining collar (20) protrudes into the through opening (14) of the decoupling bush (13) and rests against an interior wall (15), and the housing (9) has a housing opening (45) in which the decoupling bush (13) engages with a bush groove (44) at the second contact point (25).

11. The decoupling device according to claim 10, in which adjoining the second contact point (25), the decoupling bush (13) has a balancing section (46), on an end (49) of the balancing section, a covering protrudes into the through opening (14) of the decoupling bush (13) and has a cover shaft (52), wherein the cover collar (51) rests against the interior wall (15) of the through opening (14) and the cover shaft (52) penetrates the through opening (14) with radial clearance and is fastened to the motor mount (8).

12. A decoupling device for an electric motor in relation to a housing, comprising a motor mount that is connected to a motor housing of the electric motor and at least two decoupling elements made of elastic material, which extend along a longitudinal axis and coaxially to the axis and each of the at least two decoupling element have a through opening with an interior wall, wherein each decoupling element (13) at least indirectly rests with a first contact point (22) against the motor mount (8) and rests with a second contact point (25) at least indirectly against the housing (9), the decoupling element is embodied as a decoupling bush (13) and, between the first contact point (22) and the second contact point (25), each decoupling bush (13) is secured so that the decoupling bush can be radially deflected in relation to the longitudinal axis (10), and a circumferential retaining collar (20) is embodied on the motor mount (8) and at the first contact point (22) this retaining collar (20) is U-shaped and, forming a retaining groove (40), protrudes into the through opening (14) of the decoupling bush (13), and the,decoupling bush (13) engages with a collar (43) in the retaining groove (40), and at the second contact point (25) engages with a bush groove (44) in a housing opening (45) of the housing (9).

* * * * *